US005942329A

United States Patent [19]

Nakayama et al.

[11] Patent Number: 5,942,329

[45] Date of Patent: *Aug. 24, 1999

[54] HIGH GLOSS PRINTING SHEET

[75] Inventors: Yasufumi Nakayama; Masahiro Kamiya, both of Tokyo; Shinichi Nagasaki, Ichikawa; Yoshihide Kawano, Tokyo; Toshifumi Fujii, Iwaki, all of Japan

[73] Assignee: New Oji Paper Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/598,806

[22] Filed: Feb. 9, 1996

[30] Foreign Application Priority Data

Feb. 13, 1995 [JP] Japan .................................... 7-024199

[51] Int. Cl.[6] .......................... B32B 27/16; B32B 27/30; B32B 27/40

[52] U.S. Cl. ....................... 428/423.1; 428/195; 428/207; 428/522; 528/59; 528/66; 528/75; 528/76; 526/317.1; 526/318.2; 526/318.5; 526/318.1

[58] Field of Search .................................... 428/195, 207, 428/480, 482, 522, 423.1, 423.7; 528/44, 45, 49, 59, 66, 75, 76; 526/317.1, 318.2, 318.5, 318.1

[56] References Cited

U.S. PATENT DOCUMENTS

| | | | |
|---|---|---|---|
| 4,131,602 | 12/1978 | Hodakowski et al. | 528/49 |
| 4,467,078 | 8/1984 | Kolycheck et al. | 525/455 |
| 4,911,977 | 3/1990 | Mouri et al. | 428/220 |
| 4,960,638 | 10/1990 | Mukoyoshi et al. | 428/342 |

FOREIGN PATENT DOCUMENTS

| | | |
|---|---|---|
| 0 111 011 | 6/1984 | European Pat. Off. . |
| 0 409 555 A2 | 1/1991 | European Pat. Off. . |

*Primary Examiner*—Vivian Chen

*Attorney, Agent, or Firm*—Armstrong, Westerman, Hattori, Mcleland & Naughton

[57] ABSTRACT

A printing sheet having a high gloss and an enhanced ink-setting property has an outermost surface coating layer formed on a substrate sheet from an electron beam-cured resin produced from at least one electron beam-curable unsaturated organic compound selected from unsaturated organic compounds provided with a polyether structure: $-R-CHR^1-(CHR^2)_n-O-]_m$ wherein $R^1$ is hydrogen, $R^2$ is a $C_1$–$C_5$ alkyl group, n=1–9 (n+1)×m=30 to 300, when n>2, a plurality of $R^2$ alkyl groups may be the same as or different from each other, the polyether structure having a molecular weight of 1,000 to 10,000.

2 Claims, No Drawings

HIGH GLOSS PRINTING SHEET

BACKGROUND OF THE INVENTION

1. Field of the Invention

The present invention relates to a high gloss printing sheet. More particularly, the present invention relates to a printing sheet provided with an electron beam-cured resin coating layer, arranged on the outermost surface of the sheet, having an enhanced compatibility with printing ink and exhibiting a high gloss before and after printing.

2. Description of the Related Art

It is known that a cast coated paper sheet having a high gloss is produced by coating an aqueous coating liquid containing, as principal components, a pigment and a binder on a front surface of a substrate paper sheet and the coated liquid layer is pressed onto a heating mirror surface of a casting base while the coated liquid layer still contains water and exhibits a plasticity, and then dried to form a high gloss front coating layer. The conventional cast coated paper sheet is, however, not satisfactory in gloss and thus a new type of high gloss sheet is strongly demanded.

Also, when another coating layer is further formed on the back surface of the substrate sheet in the same conventional cast-coating method as mentioned above, since the back coating layer surface comes into contact with the heating mirror surface so as to rapidly evaporate away water from the back coating layer, the front coating layer is swelled and softened by the water vapor. The phenomenon usually causes the surface smoothness and gloss of the front coating layer to decrease and thus the clearness of ink images printed on the front coating layer surface to deteriorate.

The above-mentioned disadvantages of the conventional printing sheet can be solved by a laminate coating method in which a thermoplastic resin melt is formed into a filmy stream, the filmy resin melt stream is coated on a front surface of a substrate sheet, the resultant resin melt layer of the laminate is brought into contact with a mirror-casting face of a rotating metal drum under pressure and then cooled on the mirror-casting surface to solidify the resin layer and the resultant high gloss sheet is removed from the mirror-casting face.

Alternatively, a laminate sheet having a high gloss coating layer can be produced by a cast-electron beam-irradiation method in which a coating liquid containing an electron beam-curable unsaturated organic material is coated on a front surface of a substrate sheet, the resultant coating layer is brought into contact with a casting face of a casting sheet or a casting drum under pressure and an electron beam is irradiated to the coating layer so as to cure the coating layer.

The cast coated sheets produced by the above-mentioned methods have a satisfactory high gloss.

Nevertheless, these conventional sheets are unsatisfactory as printing sheets. Namely, the conventional cast-coated sheets have an unsatisfactory suitability for printing, especially an insufficient compatibility with printing ink, in other words an unsatisfactory ink-setting property.

Particularly, when a conventional electron beam-curable unsaturated organic compound is coated on the substrate sheet and cured by electron beam irradiation, the resultant resin coating layer consists of a dense film which has a poor compatibility with the ink and thus does not allow the ink to penetrate into the resin coating layer. Also, the conventional electron beam-cured resin coating layer exhibits a poor ink-setting property. Therefore, when, on the printed surface of the conventional printing sheet, another sheet is superposed, the ink located on the printed surface is easily transferred to and soils the back surface of the superposed sheet.

This problem is considered very difficult to solve.

Also, it is known that even when the conventional electron beam-curable unsaturated compound can form a cured resin coating layer having a good ink-setting property, the gloss of the cured resin coating layer is degraded by a printing operation.

Accordingly, there is a strong demand of providing a new type of high gloss printing sheet free from the above-mentioned disadvantages.

SUMMARY OF THE INVENTION

An object of the present invention is to provide a high gloss printing sheet having a high gloss before and after printing and an enhanced suitability for printing, especially an excellent printing ink-setting property, and being useful for offset printing, gravure printing, and relief printing.

The above-mentioned object can be attained by the high gloss printing sheet of the present invention which comprises a substrate sheet, and an outermost surface coating layer formed on a surface of the substrate sheet and comprising an electron beam-cured resin produced from an electron beam-curable unsaturated organic compound-containing material, the electron beam-curable unsaturated organic compound-containing material comprising at least one member selected from the group consisting of:

(A) unsaturated reaction products of (a) reaction products of (i) at least one member selected from the group consisting of straight and branched chain alkyl diol compounds and reaction products of straight and branched chain alkyl diol compounds with hardened castor oil, with (ii) at least one member selected from the group consisting of aromatic, cycloaliphatic and aliphatic polyisocyanate compounds, with (b) at least one member selected from the group consisting of hydroxy alkylacrylate compounds and hydroxyalkylmethacrylate compounds;

(B) unsaturated organic compounds having at least one dimer acid structure derived from a dimer of an unsaturated higher fatty acid; and (C) unsaturated organic compounds provided with at least one polyether structure of the formula (1):

$$-O\left[\underset{R^1}{\underset{|}{CH}}-(\underset{R^2}{\underset{|}{CH}})_n-O\right]_m- \qquad (1)$$

wherein each of $R^1$ and $R^2$ represents, independently from each other, a member selected from the group consisting of a hydrogen atom and alkyl groups having 1 to 5 carbon atoms, n represents zero or an integer of 1 to 9, m is an integer satisfying the equation:

$$(n+1)\times m=30 \text{ to } 300,$$

and when n is 2 or more, a plurality of atoms or groups represented by $R^2$ may be the same as or different from each other, the polyether structure having a molecular weight of 1,000 to 10,000.

DESCRIPTION OF THE PREFERRED EMBODIMENTS

The inventors of the present invention energetically investigated a new type of high gloss printing sheet free from the above-mentioned disadvantages and discovered that the disadvantages can be eliminated by forming an outermost surface coating layer on a substrate sheet from a specific electron beam-curable unsaturated organic compound.

In the high gloss printing sheet of the present invention, a specific outermost surface coating layer is formed, on a surface of a substrate sheet, by an electron beam-cured resin produced from an electron beam-curable organic material.

The electron beam-curable organic material comprises at least one member selected from the group consisting of:

(A) unsaturated reaction products of
 (a) reaction products of (i) at least one member selected from the group consisting of straight and branched chain alkyl diol compounds and reaction products of straight and branched chain alkyl diol compounds with hardened castor oil, with (ii) at least one member selected from the group consisting of aromatic, cycloaliphatic and aliphatic polyisocyanate compounds, with
 (b) at least one member selected from the group consisting of hydroxyacrylate compounds and hydroxymethacrylate compounds;

(B) unsaturated organic compounds having at least one dimer acid structure derived from a dimer of an unsaturated higher fatty acid; and (C) unsaturated organic compounds provided with at least one polyether structure of the formula (1):

$$-O\left[\underset{R^1}{CH}-\left(\underset{R^2}{CH}\right)_n-O\right]_m- \qquad (1)$$

wherein each of $R^1$ and $R^2$ represents, independently from each other, a member selected from the group consisting of a hydrogen atom and alkyl groups having 1 to 5 carbon atoms, n represents zero or an integer of 1 to 9, m is an integer satisfying the equation:

$$(n+1)\times m=30 \text{ to } 300,$$

and when n is 2 or more, a plurality of atoms or groups represented by $R^2$ may be the same as or different from each other, the polyether structure having a molecular weight of 1,000 to 10,000.

It is known that polyurethane acrylate compounds and polyurethane methacrylate compounds are usable as electron beam-curable unsaturated organic compounds. However, it is quite new to utilize the specific unsaturated reaction products (A) or unsaturated organic compound (B) or (C), to form an outermost surface coating layer on a surface of a substrate sheet, to provide a high gloss printing sheet having a high suitability for printing.

In the preparation of the unsaturated reaction products (A), (i) at least one member selected from the group consisting of straight and branched chain alkyl diol compounds which preferably have a long alkyl group with 15 or more carbon atoms more preferably 30 to 350 carbon atoms, and reaction products of straight and branched chain alkyl diol compounds with hardened castor oil is reacted with (ii) at least one member selected from the group consisting of aromatic, cycloaliphatic and aliphatic polyisocyanate compounds.

The resultant reaction product (a) is further reacted with (b) at least one member selected from the group consisting of hydroxyalkyl acrylate compounds and hydroxymethacrylate compounds.

Conventional polyurethane acrylate or methacrylate compounds, which are produced by reacting polyesterurethanes or polyetherurethanes with hydroxy acrylate or methacrylate compounds, are known as electron beam-curable unsaturated organic compounds. The polyesterurethanes are obtained by reacting polyester-polyhydric alcohol compounds, which have been produced by reacting polybasic acids, for example, phthalic acid and succinic acid, with polyhydric alcohol compounds having a low molecular weight, for example, pentaerythritol, with polyisocyanate compounds. Also, the polyetherurethanes are obtained by reacting polyetherdiols with polyisocyanate compounds.

These conventional electron beam-curable organic compounds are different from the unsaturated reaction products (A), because the resultant electron beam-cured resins from the unsaturated reaction products (A) of the present invention comprise a long alkyl chain structure or a long hardened castor oil chain structure derived from the reaction component (i), whereas the conventional electron beam-cured resins are free from the long chain structure.

The reasons why the electron beam-cured resin coating layer of the present invention exhibits a high suitability for printing are not fully clear. However, it is assumed that the electron beam-cured resin having the above-mentioned long chain structure has a high hydrophilic nature, and a low crosslink density, and thus exhibits a high affinity to the printing ink and an enhanced ink-setting property.

A preferable example (A1) of the unsaturated reaction products (A) is produced by first reacting a straight or branched chain alkyl diol with a hardened castor oil; secondly reacting the first reaction product with a polyisocyanate compound selected from aromatic, cycloaliphatic and aliphatic polyisocyanate compound; and thirdly reacting the second reaction product with a hydroxy acrylate or methacrylate compound. The resultant unsaturated compound is usable as an electron beam-curable compound for the present invention.

Another preferable example (A2) of the unsaturated reaction product (A) is obtained by first reacting a straight or branched chain alkyl diol having preferably an average molecular weight of 300 or more, preferably 300 to 10,000, still more preferably 500 to 5,000, with a polyisocyanate compound selected from aromatic, cycloaliphatic and aliphatic polyisocyanate compound; and secondly reacting the first reaction product with a hydroxyacrylate or methacrylate compound.

If alkylpolyol compounds different from the long chain alkyldiol compounds and the alkyl diol-hardened castor oil reaction products are employed, the resultant electron beam-cured resin coating layer has too a high crosslink density and thus exhibits a degraded ink-setting property.

The straight or branched chain alkyl diol compounds to be reacted with the hardened castor oil are preferably selected from the group consisting of straight chain alkane diols, for example, ethane diol, 1,3-propane diol, 1,4-butane diol, 1,5-pentane diol, 1,6-hexane diol, 1,7-heptane diol, 1,8-octane diol, 1,9-nonane diol, 1,10-decane diol, 1,11-undecane diol and 1,12-dodecane diol and branched chain alkane diols, for example, neopentylglycol and 2-butyl-2-ethylpropane diol.

The straight or branched chain alkyl diols to be directly reacted with the polyisocyanate compound and preferably having a molecular weight of 300 or more are preferably selected from the group consisting of 1,2-polybutadiene diols having average molecular weights of about 500, about 1,500 and about 2,500, hydrogenated 1,2-polybutadiene diols having average molecular weights of about 500, about 1,500 and about 2,500, and polyolefin diols having average molecular weights of about 1,000, about 2,000 and about 3,000.

The alkyl diol compounds, for example, polybutadiene diol for the unsaturated reaction products (A) may be substituted by at least one substituent having no cross-linking activity.

The hardened castor oil comprises, as a principal component, hardened ricinoleic acid produced by hydrogenating ricinoleic acid which is a principal component of the castor oil, so as to convert carbon-carbon double bonds to carbon-carbon single bonds.

The reaction products of the alkyl diol compound with the hardened castor oil include, for example, dimerized hardened castor oil produced by hydrogenating ricinoleic acid, contained as a principal component in the castor oil, so as to convert carbon-carbon double bonds to carbon-carbon single bonds, and dimerizing the hydrogenated ricinoleic acid with a center unit consisting of the alkyl diol compound, for example, neopentyl glycol.

The polyisocyanate compounds for the unsaturated reaction products (A) are preferably selected from aromatic diisocyanates, for example, 2,4-tolylene diisocyanate, 2,6-tolylene diisocyanate, 4,4-diphenylmethane diisocyanate and xylylene diisocyanate; cycloaliphatic diisocyanates, for example, 3-isocyanatemethyl-3,5,5-trimethylcyclohexylisocyanate (which will be referred to as isophorone diisocyanate hereinafter), and methylene-bis(4-cyclohexylisocyanate); and aliphatic diisocyanates, for example, tetramethylene diisocyanate, hexamethylene diisocyanate and trimethylhexamethylene diisocyanate.

The hydroxy acrylate and methacrylate compounds usable for the unsaturated reaction products (A) are preferably selected from hydroxyalkyl acrylates and methacrylates, for example, 2-hydroxyethyl acrylate and methacrylate, 2-hydroxypropyl acrylate and methacrylate, and 2-hydroxybutyl acrylate and methacrylate; hydroxyphenoxyalkyl acrylates and methacrylates, for example, 2-hydroxy-3-phenoxypropyl acrylate and methacrylate; and polyacrylates and polymethacrylates of polyhydric alcohol compounds, for example, pentaerythritol triacrylate and trimethacrylate. Among these compounds, acrylates of hydroxyl compounds have a high electron beam-curability and are more preferable for the present invention.

The electron beam-curable unsaturated reaction products (A) usable for the present invention include, in the molecular structures thereof, at least one long straight or branched hydrocarbon (alkylene) structure or at least one long hydrogenated ricinoleic acid residue located between reactive terminal groups. The above-mentioned long group causes the resultant electron beam-cured resin to exhibit a high hydrophobicity and have a low crosslink density. Therefore, the outermost surface coating layer comprising the electron beam-cured resin allows the printing ink which is hydrophobic to rapidly penetrate thereinto and exhibits an enhanced ink setting property so that the penetrated ink is fixed and retained in the outermost surface coating layer.

In another embodiment of the present invention, the electron beam-curable unsaturated organic compound for the outermost surface coating layer is selected from the unsaturated organic compounds (B) having at least one dimer acid structure derived from a dimer of an unsaturated higher fatty acid.

The unsaturated organic compound (B) having at least one dimer acid structure, which is a residue of a dimer of an unsaturated higher fatty acid, may have another structure, for example, urethane structure or ester structure, as long as the unsaturated organic compound (B) is curable by irradiation by an electron beam.

The dimer of the unsaturated higher fatty acid (dimer acid) can be obtained by dimerizing a unsaturated higher fatty acid, for example, safflor oil, soybean oil, linseed oil or tall oil which contains linoleic acid, by a known dimerizing method.

The dimer acid usable for the present invention is preferably selected from polybasic acids of the formulae (2) and (3):

(2)

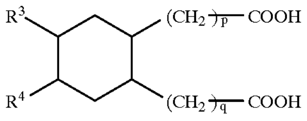

and (3)

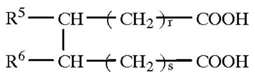

wherein each of $R^3$, $R^4$, $R^5$, and $R^6$ represents, independently from each other, an alkyl group, each of p, q, r and s represents, independently from each other, zero or an integer of 1 or more, and the sum of the total number of carbon atoms of the alkyl groups represented by $R^3$ and $R^4$ and p and q is 28, and sum of the total number of carbon atoms of the alkyl groups represented by $R^5$ and $R^6$ and r and s is 34.

The polybasic acids of the formulae (2) and (3) have two long alkyl or cycloalkyl groups, and a total carbon atom number of 36. The dimerization products of natural unsaturated higher fatty acids are mixtures of dimer acids of the formulae (2) and (3). Usually, this dimer acid mixture has a weight ratio of the dimer acid of the formula (2) to the dimer acid of the formula (3) is in the range of from 6:4 to 8:2. The weight ratio of the dimer acid (2) to the dimer acid (3) is variable depending on the dimerization reaction conditions. After the dimerization reaction, if the reaction product has unsaturated bonds, a reduction reaction may be applied to the unsaturated reaction product.

The electron beam-curable unsaturated organic compounds (B) of the present invention having at least one dimer acid structure can be prepared by first reacting the dimer acid as mentioned above with an epoxy compound and second reacting the first reaction product with at least one member selected from acrylic acid and methacrylic acid.

In another preparation method, the unsaturated organic compounds (B) can be produced by first reacting a dimer acid with an epoxy compound, secondly reacting the first reaction product with at least one member selected from aromatic, cycloaliphatic and aliphatic polyisocyanate compounds, and thirdly reacting the second reaction product with at least one member selected from the group consisting of hydroxyacrylate compounds and hydroxymethacrylate compounds. The resultant organic compounds (B) include an urethane structure.

Still another preparation method, the electron beam-curable unsaturated organic compounds (B) can be produced by reducing a dimer acid into a dimer diol, secondly reacting the dimer diol with at least one member selected from aromatic, cycloaliphatic and aliphatic polyisocyanate compounds, and then thirdly reacting the second reaction product with at least one member selected from the group consisting of hydroxyacrylate compounds and hydroxymethacrylate compounds. The resultant organic compounds (B) have an urethane structure. The reduction of the dimer acid is carried out by using, as a reducing agent, hydrogen, hydrosilane or dimide.

In a further preparation method, the electron beam-curable unsaturated organic compounds (B) can be produced by reducing the dimer acid into a dimer diol, secondly reacting the dimer diol with a polybasic carboxylic acid, and then thirdly reacting the second reaction product with at least one member selected from the group consisting of acrylic acid and methacrylic acid. The resultant unsaturated organic compounds (B) have an ester structure.

The electron beam-curable unsaturated organic compounds (B) may be employed alone or in a mixture of two or more thereof.

The epoxy compounds, the polyisocyanate compounds, the polybasic carboxylic acids, the hydroxy acrylate compounds and the hydroxy methacrylate compounds usable for the preparation of the electron beam-curable unsaturated organic compound (B) are not limited to specific types of compounds and can be selected from commonly known compounds.

The epoxy compounds usable for the preparation of the unsaturated organic compounds (B) include, for example, bisphenol A-epoxy compounds and phenol novolak-epoxy compounds.

The polyisocyanate compounds usable for the preparation of the unsaturated organic compounds (B) are preferably selected from 2,4-tolylene diisocyanate, 2,6-tolylene diisocyanate, 4,4'-diphenylmethane diisocyanate, xylylene diisocyanate, isophorone diisocyanate, methylene-bis(4-cyclohexylisocyanate), tetramethylene diisocyanate, hexamethylene diisocyanate and trimethylhexamethylene diisocyanate.

The polybasic carboxylic acids usable for the preparation of the unsaturated organic compounds (B) are preferably selected from phthalic acid, isophthalic acid, terephthalic acid, succinic acid, adipic acid, sebacic acid, trimellitic acid and pyromellitic acid.

The hydroxy acrylate and methacrylate compounds usable for the preparation of the unsaturated organic compounds (B) are preferably selected from 2-hydroxyethyl acrylate and methacrylate, 2-hydroxypropyl acrylate and methacrylate, 2-hydroxy-3-phenoxypropyl acrylate and methacrylate and pentaerythritol triacrylate and trimethacrylate.

The dimer acid structures, especially of the formulae (2) and (3), in the unsaturated organic compounds (B) effectively serve to impart a high suitability for printing, especially an enhanced ink-setting property, to the resultant outermost surface coating property.

In still another embodiment of the present invention, the electron beam-curable unsaturated organic compound for the outermost surface coating layer is selected from the unsaturated organic compound (C) provided with at least one polyether structure of the formula (1):

$$-O\left[\underset{R^1}{CH}-(\underset{R^2}{CH})_n-O\right]_m- \qquad (1)$$

wherein each of $R^1$ and $R^2$ represents, independently from each other, a member selected from the group consisting of a hydrogen atom and alkyl groups having 1 to 5 carbon atoms, n represents zero or an integer of 1 to 9, preferably 1 to 4, m is an integer satisfying the equation:

$$(n+1)\times m = 30 \text{ to } 300, \text{ preferably } 35 \text{ to } 200,$$

and when n is 2 or more, a plurality of atoms or groups represented by $R^2$ may be the same as or different from each other, the polyether structure having a molecular weight of 1,000 to 5,000, preferably 1,000 to 5,000.

If n is more than 9, the preparation of the polyether structure becomes difficult and costly. Also, if (n+1)×m is less than 30, the resultant outermost surface layer exhibits an unsatisfactory suitability for printing, especially an unsatisfactory ink-setting property. Also, if (n+1)×m is more than 300, the resultant unsaturated organic compounds (C) exhibits too a high viscosity and a poor fluidity and thus handling of the compound (C) becomes difficult.

The electron beam-curable unsaturated organic compounds (C) may have an urethane structure and/or a ester structure in addition to the polyether structure of the formula (1).

The polyether compounds usable for introducing the polyether structure of the formula (1) into the unsaturated organic compound (C) are preferably selected from, for example, polyethylene glycol, polypropylene glycol, poly-1,4-butylether, poly-2,3-butylether, polytetrahydrofuran, and block and random copolymers of the above-mentioned polyether compounds with other polymerizable organic compounds, for example, acrylamide, diphenylmethane-4,4'-diisocyanate, ester of adipic acid with ethylene glycol, vinyl acetate, phthalic acid, maleic acid and bisphenol A.

The molecular weight of the polyether structure of the formula (1) is 1,000 to 10,000, preferably 1,000 to 5,000. If the molecular weight is less than 1,000, the resultant electron beam-cured resin exhibits too high a crosslink density, and thus the resultant outermost surface coating layer exhibits too high a resistance to penetration of the ink thereinto, and thus a poor ink-setting property. Also, if the molecular weight is more than 10,000, the resultant unsaturated organic compound (C) exhibits too high a viscosity and a poor fluidity and thus becomes difficult to handle.

The electron beam-curable unsaturated organic compounds (C) can be prepared by reacting a polyether compound having the polyether structure of the formula (1) with at least one member selected from the group consisting of acrylic acid and methacrylic acid.

In another preparation method, the unsaturated organic compounds (C) can be produced by first reacting a polyether compound having the polyether structure of the formula (1) with a polybasic carboxylic acid, and secondly reacting the first reaction product with at least one member selected from the group consisting of acrylic acid and methacrylic acid. The resultant unsaturated organic compounds have an ester structure in addition to the polyether structure.

In still another preparation method, the unsaturated organic compounds (C) can be produced by first reacting a polyether compound having the polyether structure of the formula (1) with at least one member selected from aromatic, cycloaliphatic and aliphatic polyisocyanate compounds, and secondly reacting the first reaction product with at least one member selected from the group consisting of hydroxyacrylate compounds and hydroxymethacrylate compounds. The resultant unsaturated organic compounds have, in addition to the polyether structure, a urethane structure which effectively causes the resultant electron beam-cured resins to exhibit enhanced softness and flexibility.

The polybasic carboxylic acids, the polyisocyanate compounds, and the hydroxy acrylate and methacrylate compounds usable for the preparation of the unsaturated organic compounds (C) can be selected from the same types of compounds as those for the unsaturated organic compounds (B), as mentioned above.

The unsaturated organic compound (C) can be employed alone or in a mixture of two or more thereof.

The polyether structure of the formula (1) in the unsaturated organic compounds (B) effectively imparts a high suitability for printing, especially an enhanced ink-setting property, to the resultant outermost surface coating property.

The outermost surface coating layer of the high gloss printing sheet of the present invention can be formed only from at least one member selected from the electron beam-curable unsaturated organic compounds (A), (B), and (C). Nevertheless, when the compounds (A), (B) and/or (C) have a high viscosity, at least one additional electron beam-curable unsaturated organic compound having a low viscosity may be employed together with the specific compound (A), (B) and/or (C), to control the viscosity. The additional unsaturated organic compounds are not limited to specific type of compounds, may be mono-functional or poly-functional and may be employed alone or in a mixture of two or more thereof.

The additional unsaturated organic compound is preferably employed in an amount of 80% by weight or less more preferably 70% by weight or less, based on the total weight of the electron beam-curable organic material. Therefore, the specific unsaturated organic compound (A), (B) and/or (C) is preferably employed in an amount of 20% by weight or more preferably 30% by weight or more, based on the total weight of the electron beam-curable organic material.

The additional unsaturated organic compound usable for the present invention is preferably selected from the following compound.

(1) Acrylate and methacrylate compounds of mono- to hexa-hydric aliphatic, cycloaliphatic and aromatic alcohols and polyalkylene glycols (2) Acrylate and methacrylate compounds of addition reaction products of mono- to hexa-hydric aliphatic, cycloaliphatic and aromatic alcohols with alkylene oxides (3) Polyacryloylalkylphosphoric acid esters and polymethacryloylalkylphosphoric acid esters (4) Reaction products of polybasic carboxylic acids with polyols and acrylic and/or methacrylic acid (5) Reaction products of polyisocyanate compounds with polyols and acrylic and/or methacrylic acid (6) Reaction products of epoxy compounds with acrylic and/or methacrylic acid (7) Reaction products of epoxy compounds with polyols and acrylic and/or methacrylic acid The additional unsaturated organic compounds usable for the present invention include the particular mono-functional monomers of: methyl acrylate, ethyl acrylate, lauryl acrylate, stearyl acrylate, N-vinyl pyrrolidone, acryloylmorpholine, 2-ethylhexyl acrylate, 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, tetrahydrofurfuryl acrylate, tetrahydrofurfuryl methacrylate, caprolacton-modified tetrahydrofurfuryl acrylate, cyclohexyl acrylate, cyclohexyl methacrylate, dicyclohexyl acrylate, isobornyl acrylate, isobornyl methacrylate, benzyl acrylate, benzyl methacrylate, ethoxydiethyleneglycol acrylate, methoxytriethyleneglycol acrylate, methoxypropyleneglycol acrylate, phenoxypolyethyleneglycol acrylate, phenoxypolypropyleneglycol acrylate, nonylphenoxypolyethyleneglycol acrylate, ethyleneoxide-modified phenoxy acrylate, nonylphenoxypolypropyleneglycol acrylate, N,N-dimethylaminoethyl acrylate, N,N-dimethylaminoethyl methacrylate, 2-ethylhexylcarbitol acrylate, ω-carboxypolycaprolactone monoacrylate, monohydroxyethyl acrylate phthalate, acrylic acid dimer, 2-hydroxy- 3-phenoxypropyl acrylate, 9,10-epoxidized oleyl acrylate, 9,10-epoxidized oleyl methacrylate, ethyleneglycol monoacrylate maleate, dicyclopentenyl acrylate, dicyclopentanyl acrylate, dicyclopentenyloxyethylene acrylate, acrylates of caprolactone addition reaction products of 4,4'-dimethyl-1,3-dioxolane, acrylates of caprolactone-addition reaction products of 3-methyl-5,5-dimethyl-1,3-dioxolane, polybutadiene acrylate, and ethylene oxide-modified phenoxidized phosphoric acid acrylate; and the particular polyfunctional monomers of: ethanediol diacrylate, ethane diol dimethacrylate, 1,3-propanediol diacrylate, 1,3-propanediol dimethacrylate, 1,4-butanediol diacrylate, 1,4-butanediol dimethacrylate, 1,6-hexanediol diacrylate, 1,6-hexanediol dimethacrylate, 1,9-nonanediol diacrylate, 1,9-nonanediol dimethacrylate, 1,14-tetradecanediol diacrylate, 1,15-pentadecanediol diacrylate, diethyleneglycol diacrylate, polyethyleneglycol diacrylate, polyethyleneglycol dimethacrylate, polypropyleneglycol diacrylate, polypropyleneglycol dimethacrylate, neopentylglycol diacrylate, 2-butyl-2-ethylpropanediol diacrylate, ethyleneoxide-modified bisphenol A diacrylate, polyethyleneoxide-modified bisphenol A diacrylate, polyethyleneoxide-modified hydrogenated bisphenol A diacrylate, propyloxide-modified bisphenol A diacrylate, polypropyleneoxide-mnodified bisphenol A diacrylate, hydroxypivalic acid ester-neopentylglycolester diacrylate, diacrylates of caprolactone-addition reaction products of hydroxypivalic acid ester-neopentylglycolester, ethyleneoxide-modified isocyanuric acid diacrylate, pentaerythritol diacrylate monostealate, acrylic acid-addition reaction product of 1,6-hexanediol diglycidylether, polyoxyethyleneepichlorohydrin-modified bisphenol A diacrylate, tricyclodecanedimethanol diacrylate, trimethylolpropane triacrylate, ethyleneoxide-modified trimethylolpropane triacrylate, polyethyleneoxide-modified trimethylolpropane triacrylate, propyleneoxide-modified trimethylolpropane triacrylate, polypropyleneoxide-modified trimethylolpropane triacrylate, pentaerythritol triacrylate, ethyleneoxide-modified isocyanuric acid triacrylate, ethyleneoxide-modified glycerol triacrylate, polyethyleneoxide-modified glycerol triacrylate, propyleneoxide-modified glycerol triacrylate, polypropyleneoxide-modified glycerol triacrylate, pentaerythritol tetracrylate, ditrimethylolpropane tetracrylate, dipentaerythritol tetracrylate, dipentaerythritol pentacrylate, dipentaerythritol hexacrylate, caprolactone-modified dipentaerythritol hexacrylate, and polycaprolactone-modified dipentaerythritol hexacrylate.

In the production of the high gloss printing sheet of the present invention, to enhance the surface smoothness and gloss of the sheet, the electron beam-cured resin outermost surface coating layer is preferably formed by a cast method. Also, to improve the whiteness of the sheet, the electron beam-curable organic material preferably contains a white pigment.

Also, when the substrate sheet comprises a paper sheet, at least one undercoating layer is preferably formed between the substrate sheet and the outermost surface coating layer. Namely, the undercoating layer is formed preferably from a clear electron beam-curable organic material free from the pigment by an electron beam irradiation, and the outermost surface coating layer is formed preferably from an electron beam-curable organic material containing a white pigment by an electron beam irradiation. In the formation of the undercoating layer and the outermost surface coating layer, the cast method is preferably utilized.

The pigment for the outermost surface coating layer is not limited to a specific type of pigment. Usually, the pigment comprises at least one member selected from inorganic pigments, for example, clay, kaolin, talc, magnesium hydroxide, aluminum hydroxide, ground calcium carbonate, precipitated calcium carbonate, titanium dioxide (anatase and rutil), zinc oxide and barium sulfate; and organic pigments known as plastic pigments, for example, polystyrene. These pigments are all white colored and may be surface-treated or non-surface-treated. The surface treatment of the pigment particles can be carried out with a siloxane, alumina, alcohol or silane-coupling agent. The pigment may consist of a single substance alone or a mixture of two or more substances. When the pigment is used, the electron beam-curable organic material contains, if necessary, a conventional additive, for example, dispersing agent, release agent, defoaming agent, coloring material, dye and antiseptic agent.

The pigment is used preferably in an amount of 10 to 80% by weight, more preferably 20 to 60% by weight based on the total weight of the electron beam-curable composition for the outermost surface coating layer. If the pigment content is less than 10% by weight, the resultant outermost surface coating layer may exhibit an unsatisfactory opacifying effect. Also, if the pigment content is more than 80% by weight, the resultant composition may exhibit too a high viscosity and a poor fluidity.

The white pigment can be uniformly dispersed in the electron beam-curable organic material by using a three roll mill, two roll mill, homomixer, sand grinder, planetary mixer and ultrasonic dispersing machine.

The high gloss printing sheet of the present invention optionally further comprises at least one undercoating layer comprising an electron beam-cured resin and arranged between the substrate sheet and the outermost surface coating layer. When the electron beam-cured resin for the undercoating layer is different from that for the outermost surface coating layer and has a high crosslink density, the resultant undercoating layer does not allow the printing ink to penetrate thereinto. Therefore, the printing ink is received by and retained in only the outermost surface coating layer so as to form ink images having high clearness and color density. Also, since the undercoating layer having a high crosslink density is not swollen by the ink, the outermost surface coating layer can maintain a high gloss even after printing.

It is preferable that the electron beam-curable organic compound for the undercoating layer has a chemical structure close to that of the specific electron beam-curable organic compounds for the outermost surface coating layer; and thus the resultant undercoating layer exhibits high adhesion to the outermost surface coating layer.

The electron beam-curable unsaturated organic compound for the undercoating layer is preferably selected from the class consisting of:

(1) acrylate and methacrylate compounds of mono- to hexa-hydric aliphatic, cycloaliphatic and aromatic alcohols and polyalkylene glycols, (2) acrylate and methacrylate compounds of addition reaction products of mono- to hexa-hydric aliphatic, cycloaliphatic and aromatic alcohols with alkylene oxides, (3) polyacryloylalkylphosphoric acid esters and polymethacryloylalkylphosphoric acid esters, (4) reaction products of polybasic carboxylic acids with polyols and acrylic and/or methacrylic acid, (5) reaction products of polyisocyanate compounds with polyols and acrylic and/or methacrylic acid, (6) reaction products of epoxy compounds with acrylic and/or methacrylic acid, and (7) reaction products of epoxy compounds with polyols and acrylic and/or methacrylic acid.

The substrate sheet for the present invention can be selected sheet materials usable for the conventional printing sheets. For example, the substrate sheet comprises a paper sheet, for example, woodfree paper sheet, thermoplastic film, woven or knitted fabric, nonwoven fabric, and metallic foil, for example, aluminum foil, all of which have a small thickness. Preferably the substrate sheet consists of a paper sheet.

The paper sheets usable as a substrate sheet of the high gloss printing sheet of the present invention is preferably provided with a smooth surface and has a basic weight of 50 to 300 $g/m^2$.

There is no limitation to the type of the paper sheet. Namely, the pulp for the paper sheet can be selected from natural pulps including soft wood pulps, for example, fir pulp and hemlock pulp, hard wood pulps, for example, maple tree pulp, beech pulp and poplar pulp, and mixture of the soft wood pulps with the hard wood pulps. Also, the pulp may be a bleached kraft pulp, bleached sulfide pulp or bleached soda pulp. The paper sheet may contain synthetic fibers and/or pulp.

The paper sheet of the present invention may contain at least one conventional additive, for example, a dry paper-strengthen-agent, sizing agent, filler, wet paper-strengthen-agent, fixing agent and pH-adjusting agent.

The substrate sheet usable for the present invention may be selected from pigment-coated paper sheets for example, coated paper, cast-coated paper and art paper sheets having at least one coating layer formed on one or two surfaces of a paper base sheet and comprising a mixture of a pigment, for example, clay, talc, kaolin, calcium carbonate, aluminum hydroxide, titanium dioxide, magnesium hydroxide, or plastic pigment with a synthetic resin, for example, polyacrylic ester resin, polyurethane resin, ethylene-acrylic acid copolymer resin, vinyl acetate-ethylene copolymer resin, styrene-butadiene copolymer resin, or polyvinylidene chloride resin; and laminated paper sheets in which one or two surfaces of a paper base sheet are coated by a polyolefin resin, for example, polyethylene resin.

When the substrate sheet consists of a paper sheet, a barrier layer may be formed on the front surface of the substrate sheet from a barrier material, for example, polyvinyl alcohol, hydroxyethyl cellulose or oxidized starch which can hinder the electron beam-curable organic material to penetrate into the paper sheet. When the barrier layer is formed on the substrate sheet surface, the outermost surface coating layer can be formed directly on the barrier layer, without coating the clear electron beam-cured undercoating layer.

The substrate sheet of the high gloss printing sheet of the present invention can be formed from a plastic film or synthetic paper sheet. The plastic film usable for the substrate sheet can be produced by melt-extruding a thermoplastic resin composition comprising for example, a polyolefin resin such as polypropylene resin or polyethylene resin into a thin sheet form through a thin slit. The synthetic paper sheet can be produced by converting a synthetic resin film to a synthetic paper sheet usable as a substrate sheet for the present invention.

The synthetic resin film and the synthetic paper sheet usable as a substrate sheet for the present invention optionally contain a pigment comprising at least one member selected from, for example, clay, talc, kaolin, calcium carbonate, titanium dioxide and magnesium hydroxide; metal soaps, for example, zinc stearate; a dispersing agent comprising at least one surfactant and/or a coloring pigment.

The high gloss printing sheet of the present invention comprising a substrate sheet, an undercoating layer and an outermost surface coating layer can be produced by the following process.

A clear electron beam-curable unsaturated organic compound composition is coated on a surface of a substrate sheet to form an inside coating liquid layer. Separately, an electron beam curable unsaturated organic compound-pigment composition is coated on a smooth surface of a casting base to form an outermost surface coating liquid layer.

The inside coating liquid layer on the substrate sheet is superposed on the outermost surface coating liquid layer on the casting base, and to the resultant laminate, an electron beam irradiation is applied to cure both the liquid layer and adhere them to each other. A cured laminate consisting of a substrate sheet, an undercoating layer adhered to the substrate sheet and an outermost surface coating layer adhered to the undercoating layer. The resultant cured laminate is separated from the casting base.

In another process for producing the high gloss printing sheet, a clear electron beam-curable unsaturated organic compound composition is coated on a surface of a substrate sheet to form an inside coating liquid layer; separately, an electron beam-curable unsaturated organic compound-pigment composition is coated on a smooth surface of a casting base to form an outermost surface coating liquid layer; an electron beam irradiation is applied to outermost surface coating liquid to partially cure the liquid layer; the inside coating liquid layer on the substrate sheet is superposed on the partially cured outermost surface coating layer on the casting base; to the resultant laminate, an irradiation of electron beam is applied to completely cure the superposed inside coating layer and partially cured outermost surface coating layer and to adhere them to each other. The resultant laminate, consisting of a substrate sheet, an undercoating layer adhered to the substrate sheet and an outermost surface coating layer adhered to the undercoating layer, is separated from the casting base.

In still another process for producing the high gloss printing sheet of the present invention, an electron beam-curable unsaturated organic compound is coated on a surface of a substrate sheet; the resultant coating liquid layer is cured by an electron beam irradiation to form an undercoating layer; an electron beam-curable unsaturated organic compound is coated on the undercoating layer surface; the resultant coating liquid layer is brought into contact with a smooth surface of a casting base; an electron beam irradiation is applied to the coating liquid layer on the casting base to form a cured outermost surface coating layer bonded to the substrate sheet through the cured undercoating layer; and the resultant high gloss printing sheet is separated from the casting base.

The casting base usable for the above-mentioned processes may be a rotatable metallic drum. There is no limitation to the type of metal and to the form and dimensions of the drum. For example, the drum is made from a stainless steel, copper, or chromium, and has a mirror-finished smooth periphery. To smoothly separate the outermost surface coating layer of the laminate from the casting base, a release agent, for example, a silicone oil or wax may be applied to the surface of the casting base.

The casting base may be a casting sheet having a smooth casting surface. The casting sheet is selected from, for example, plastic films, for example, polyester films; metal sheets, resin-coated paper sheets, metallized plastic films and metallized paper sheets. The smooth surface of the casting sheet may be coated with a release agent, for example, a silicone oil or wax, to make the separation of the outermost surface coating layer of the resultant laminate from the casting base easy. Alternatively, a releasing surface treatment, for example, a silicone surface treatment, may be applied to the casting surface of the casting sheet, to make the separation of the outermost surface coating layer from the casting surface easy.

The sheet materials used as a casting sheet may be formed in an endless belt form. The casting sheet may be employed repeatedly. However, the casting sheet is deteriorated by the repeated electron beam irradiations. Therefore, there is a limitation to the repeated uses of the casting sheet.

The coating method of the electron beam-curable unsaturated organic compound composition on the casting surface of the casting base, for example, rotating metallic casting drum or the substrate sheet, or the coating method of an overcoating resin material on the outermost surface coating layer may be selected from conventional coating methods, for example, bar-coating method, air doctor-coating method, blade-coating method, squeeze-coating method, air knife-coating method, roll-coating method, gravure-coating method, transfer-coating method, comma-coating method, smoothing-coating method, microgravure-coating method, reverse roll-coating method, multiroll-coating method, dip-coating method, rod-coating method, kiss-coating method, gate roll-coating method, falling curtain-coating method, slide-coating method, fountain-coating method and slit die-coating method. Especially when a rotating metallic drum is used as a casting base, the roll-coating method using a rubber coating roll or the offset gravure coating method are preferably used and a non-touch type fountain-coating method and slit die-coating method are advantageously employed, to protect the metallic drum periphery from damage.

In the high gloss printing sheet of the present invention, the undercoating layer and the outermost surface coating layer are preferably present in a total amount of 3 to 60 $g/m^2$, more preferably 5 to 40 $g/m^2$, after curing. If the total amount is less than 3 $g/m^2$, the resultant coating layer may exhibit an unsatisfactory surface smoothness, a bad appearance and a reduced gloss. Also, if the total amount is more than 60 $g/m^2$, the coating effect is saturated and the resultant coating layer may become costly.

To impart a smooth appearance to the outermost surface coating layer, the amount of the cured outermost surface coating layer is preferably controlled to 0.1 $g/m^2$ or more, more preferably 0.3 to 20 $g/m^2$. If the amount is less than 0.1 $g/m^2$, even if a pigment is contained in a large content in the layer, the opacifying effect of the resultant outermost surface coating layer may be unsatisfactory. Also, when the undercoating layer is arranged between the substrate sheet and the outermost surface coating layer, the undercoating layer is present in an amount of 3 $g/m^2$ or more, more preferably 5 to 20 $g/m^2$. If the amount is less than 3 $g/m^2$, the coating effect of the undercoating layer for smoothening the rough surface of the substrate sheet and for enhancing the smoothness of the outermost surface coating layer, may be unsatisfactory.

In the high gloss printing sheet of the present invention, an additional undercoating layer is optionally arranged between the substrate sheet and the undercoating layer or the outermost surface coating layer to enhance the adhesion therebetween. The additional undercoating layer is preferably formed from a synthetic resin, for example, an alkyd resin, acrylic or methacrylic resin, vinyl resin, cellulosic resin, polyurethane resin, polyester resin or a copolymer resin thereof. The synthetic resin is dissolved or dispersed in an organic solvent or an aqueous solvent, and the resultant coating liquid is applied. The additional undercoating layer may be formed from an electron beam-curable unsaturated organic compound composition or an ultraviolet ray-curable resin composition. The additional undercoating layer is commonly utilized in the laminate sheets having a coating layer formed from an electron beam-curable unsaturated organic compound. For example, the additional undercoating layer is utilized for support sheets of photographic printing sheets, electrophotographic paper sheets, substrate sheets of thermosensitive printing sheets, release sheets, thermal transfer image-receiving sheets, ink-jet recording sheets and packing paper sheets each having an electron beam-cured resin coating layer.

The electron beam irradiation can be carried out by using conventional electron beam irradiation apparatus, for example, Van de Gruaff scanning type, double scanning type, broadbeam type and curtain beam type electron beam irradiation apparatuses. Among these apparatuses, the curtain beam type electron beam irradiation apparatus, which is relatively cheap and can produce a large output, can be used advantageously for the production of the high gloss printing sheet of the present invention.

In the electron beam irradiation, the acceleration voltage is preferably 100 to 300 kV and the absorption dose is preferably 0.1 to 8 Mrad, more preferably 0.5 to 5 Mrad.

The electron beam irradiation may be carried out in an atmosphere containing oxygen preferably in a content of 1,000 ppm or less, more preferably 500 ppm or less. If the oxygen content is more than 1,000 ppm, the curing reaction of the electron beam-curable unsaturated organic compound may be obstructed. The electron beam irradiation atmosphere optionally contains an inert gas which effectively restricts the generation of ozone due to the electron beam irradiation and to cool the windows of the apparatus for electron beam irradiation in which window heat is generated due to the electron beam irradiation.

There is no limitation to the type of the inert gas and the temperature and humidity of the atmosphere. The inert gas may be nitrogen gas.

EXAMPLES

The present invention will be further explained by the following examples which are merely representative and do not restrict the scope of the present invention in any way.

Example 1

A high gloss printing sheet was produced by the following procedures.

Preparation of Electron Beam-curable Coating Liquid

An electron beam-curable coating liquid was prepared by mixing 70 parts by weight of an electron beam curable compound (1) prepared by first reacting a dimerized hardened castor oil, which was prepared by dimerizing castor oil together with a center unit consisting of neopentyl glycol, with isophorone diisocyanate and second reacting the first reaction product with 2-hydroxyethyl acrylate, with 30 parts by weight of 2-hydroxy-3-phenoxypropyl acrylate, in a homomixer at a rotation rate of 2,000 rpm for 20 minutes.

Production of High Gloss Printing Sheet

The above-mentioned electron beam-curable coating liquid was coated in a dry (cured) amount of 20 $g/m^2$ on the back surface of a front surface-cast-coated paper sheet having a basis weight of 160 $g/m^2$; a polyethylene terephthalate (PET) film having a thickness of 75 $\mu$m was superposed on the coating liquid layer; an electron beam irradiation was applied under an acceleration voltage of 175 kV at an absorption dose of 4 Mrad to the coating liquid layer through the PET film, to cure the coating liquid layer; and the PET film was removed from the cured coating resin layer. A high gloss printing sheet was obtained.

Tests and Evaluations (1) Gloss

The high gloss printing sheet was subjected to a white sheet gloss test using a gloss meter (trademark: VGS-1D, made by Nihon Denshoku Kogyo K.K.) at 60°/60° in accordance with JIS Z 8741.

When the measured gloss is 75 or more, the tested printing sheet is evaluated as satisfactory in the white sheet gloss.

(2) Suitability for printing (printing ink-setting property)

The high gloss printing sheet was printed by using a RI printing tester (trademark: RI-2, made by Akira Seisakusho) under the following conditions.

| | |
|---|---|
| Type of ink: | Indigo blue-coloring ink (DIC FINE INK F Gloss N-type, made by Dainihon Inki Kagakukogyo K.K.) |

Amount of ink: 2.0 $ml/m^2$

Printing speed: 30 rpm

The printing drum was rotated at the above-mentioned speed, the resultant printed surface of the printing sheet was superposed with a casted surface of a cast-coated paper sheet; the printing rubber roll was replaced with a clean one; 5 minutes after the replacement, the printing drum was rotated and the cast-coated paper sheet was removed from the printed surface of the printing sheet.

The removed cast-coated paper sheet was subjected to a color density measurement by using a Macbeth Reflective color density tester (trademark: RD-914). When the measured color density is less than 0.6, the tested printing sheet is evaluated as satisfactory in ink-setting property.

The test results are shown in Table 1.

Example 2

A high gloss printing sheet was produced and tested by the same procedures as in Example 1, except that the electron beam-curable coating liquid had the following composition.

| Component | Part by weight |
|---|---|
| An electron beam-curable compound (2) | 50 |
| 2-hydroxy-3-phenoxypropyl acrylate | 50 |

The electron beam-curable compound (2) was prepared by first reacting a dimerized hardened castor oil (prepared by dimerizing castor oil together with a center unit consisting of neopentyl glycol) with isophorone diisocyanate, and secondly reacting the first reaction product with 2-hydroxyethyl acrylate.

The test results are shown in Table 1.

Example 3

A high gloss printing sheet was produced and tested by the same procedures as in Example 1, except that the electron beam-curable coating liquid had the following composition.

| Component | Part by weight |
|---|---|
| Electron beam-curable compound (3) | 70 |
| 2-butyl-2-ethylpropanediol diacrylate | 30 |

The electron beam-curable compound (3) was prepared by first reacting a polyolefindiol having an average molecular weight of 2,000 with isophorone diisocyanate, and secondly reacting the first reaction product with 2-hydroxyethyl acrylate.

The test results are shown in Table 1.

Example 4

A high gloss printing sheet was produced and tested by the same procedures as in Example 1, except that the electron beam-curable coating liquid had the following composition.

| Component | Part by weight |
|---|---|
| Electron beam-curable compound (4) | 50 |
| 2-butyl-2-ethylpropanediol diacrylate | 25 |
| 1,9-nonanediol diacrylate | 25 |

The electron beam-curable compound (4) was prepared by first reacting a polyolefindiol having an average molecular weight of 2,000 with isophorone diisocyanate, and secondly reacting the first reaction product with 2-hydroxyethyl acrylate.

The test results are shown in Table 1.

Example 5

A high gloss printing sheet was produced and tested by the same procedures as in Example 1, except that the substrate sheet consisted of a synthetic paper sheet having a basis weight of 74 $g/m^2$ (trademark: Yupo FPG-95, made by Oji Yuka Goseishi K.K.), the electron beam-curable coating liquid had the following composition, and in the electron beam irradiation, the absorption dose was 3 Mrad.

| Component | Part by weight |
|---|---|
| Electron beam-curable compound (5) | 50 |
| 2-butyl-2-ethylpropanediol diacrylate | 50 |

The electron beam-curable compound (5) was prepared by first reacting a hydrogenated 1,2-polybutadienediol having an average molecular weight of 500 with a 2,4- and 2,6-tolylene diisocyanate mixture, and secondly reacting the first reaction product with 2-hydroxyethyl acrylate. This electron beam curable compound (5) was available under the trademark of TEAI-1000, from Nihon Soda K.K.

The test results are shown in Table 1.

Comparative Example 1

A high gloss printing sheet was produced and tested by the same procedures as in Example 1, except that the electron beam-curable coating liquid had the following composition.

| Component | Part by weight |
|---|---|
| Rosin ester acrylate (Trademark: Beam Set 115, made by Arakawa Kagakukogyo K.K.) | 50 |
| 2-hydroxy-3-phenoxypropyl acrylate | 50 |

The test results are shown in Table 1.

Comparative Example 2

A high gloss printing sheet was produced and tested by the same procedures as in Example 1, except that the electron beam-curable coating liquid had the following composition.

| Component | Part by weight |
|---|---|
| Urethane acrylate | 50 |
| 2-butyl-2-ethylpropanediol diacrylate | 50 |

The urethane acrylate is a reaction product prepared by first reacting a polyester diol consisting of a poly (caprolactone)diol with isophorone diisocyanate and secondly reacting the first reaction product with hydroxyethyl acrylate, and is available under the trademark of Beam set 550B, from Arakawa Kagakukogyo K.K.

The test results are shown in Table 1.

Comparative Example 3

A high gloss printing sheet was produced and tested by the same procedures as in Example 1, except that the electron beam-curable coating liquid consisted of 100 parts by weight of trimethylolpropane triacrylate.

The test results are shown in Table 1.

Comparative Example 4

A one side-cast coated paper sheet having a basis weight of 160 $g/m^2$ was subjected to the same printing and test procedures as in Example 1.

The test results are shown in Table 1.

TABLE 1

| Example No. | | White sheet gloss | Ink-setting property |
|---|---|---|---|
| Example | 1 | 91 | 0.17 |
| | 2 | 93 | 0.35 |
| | 3 | 88 | 0.05 |
| | 4 | 89 | 0.40 |
| | 5 | 87 | 0.25 |
| Comparative Example | 1 | 95 | 1.22 |
| | 2 | 92 | 1.02 |
| | 3 | 92 | 1.10 |
| | 4 | 60 | 0.05 |

Table 1 clearly shows that the high gloss printing sheets of Examples 1 to 5 in accordance with the present invention had a high white sheet gloss and a satisfactory suitability for printing, particularly a high ink-setting property.

The comparative printing sheets of Comparative Examples 1 to 3 in which none of the specific electron beam-curable unsaturated organic compounds of the present invention was employed, exhibited a poor ink-setting property. Also, the conventional cast-coated paper sheet had a very low white sheet gloss, as shown in Comparative Example 4.

Example 6

A high gloss printing sheet was produced by the following procedures.

Preparation of Electron Beam-Curable Coating Liquids (1) and (2)

Coating Liquid (1) for an Outermost Surface Coating Layer

| Component | Part by weight |
|---|---|
| Electron beam-curable compound (6) | 70 |
| 2-hydroxy-3-phenoxypropyl acrylate (Trademark: Aronix M-5700, made by Toa Gosei K.K.) | 30 |

The electron beam-curable compound (6) was produced by first reacting a dimerized hardened castor oil (prepared by dimerizing caster oil together with a center unit consisting of neopentyl glycol) with isophorone diisocyanate and secondly reacting the first reaction product with 2-hydroxyethyl acrylate. The components were uniformly mixed by using a homomixer at a rotation rate of 2,000 rpm for 20 minutes.

Coating Liquid (2) for Undercoating Layer

| Component | Part by weight |
|---|---|
| Electron beam-curable compound mixture (Principal components: polyurethane oligomers, Trademark: Beam set 505A-6, made by Arakawa Kagakukogyo K.K.) | 100 |

Production of High Gloss Printing Sheet

The coating liquid (1) was coated in a dry (cured) coating weight of 2 $g/m^2$ on a surface of a polyethylene terephthalate (PET) film having a thickness of 75 $\mu$m by using a wire bar, and the resultant coating liquid (1) layer was cured by an electron beam irradiation under an acceleration voltage of 175 kV at an absorption dose of 1 Mrad in gas atmosphere having an oxygen content of 500 ppm or less, to form an electron beam-cured resin layer (1) for an outermost surface coating layer.

Separately, the coating liquid (2) was coated in a dry (cured) coating weight of 20 g/m$^2$ on a back surface of a front surface-cast coated paper sheet having a basis weight of 160 g/m$^2$.

The coated PET film was superposed on the coated paper sheet so that the cured resin layer (1) comes into contact with the coating liquid (2) layer. Electron beam irradiation was applied to the coating liquid (2) layer through the PET film under an acceleration voltage of 175 kV at an absorption dose 3 Mrad so as to cure the coating liquid (2) layer and to adhere the resultant cured resin layer (2) to the cured resin layer (1). The resultant laminate sheet was separated from the PET film. A high gloss printing sheet was obtained.

The printing sheet was subjected to the following tests and evaluations.

(1) White sheet gloss

The white sheet gloss of the printing sheet was measured and evaluated in the same manner as in Example 1.

(2) Gloss after printing

The printing sheet was printed by an RI printing tester (trademark: RI-2, made by Akira Seisakusho) under the following conditions.

| | |
|---|---|
| Type of ink: | Indigo blue-coloring ink (DIC Trans-G N-type, made by Dainihon Inki Kagakukogyo K.K.) |

Amount of ink: 2.0 ml/m$^2$

Printing speed: 30 rpm

The resultant printed sheet was left to stand for 24 hours to dry the ink.

The gloss of the printing sheet after printing was measured by the gloss meter (VGS-1D, Nihon Denshoku Kogyo K.K.) at 60°/60° in accordance with JIS Z 8741. When the measured gloss after printing was 75 or more, the printing sheet was evaluated satisfactory for practical use.

(3) Suitability for printing (Ink-setting property)

This test was carried out in the same manner as that in Example 1, except that when the measured color density was less than 0.35, the resultant printing sheet was evaluated satisfactory for practice.

The test results are shown in Table 2.

Example 7

A high gloss printing sheet was produced and tested by the same procedures as in Example 6 except that the coating liquid (1) for the outermost surface coating layer was replaced by a coating liquid (3) having the following composition.

Coating liquid (3)

| Component | Part by weight |
|---|---|
| Electron beam-curable compound (8) | 50 |
| 2-hydroxy-3-phenoxypropylacrylate (trademark: Aronix M-5700, made by Toa Gosei K.K.) | 50 |

The electron beam-curable compound (7) was prepared by first reacting a dimerized hardened castor oil (prepared by dimerizing a hardened castor oil together with a center unit consisting of neopentyl glycol) with isophorone diisocyanate, and secondly reacting the first reaction product with 2-hydroxyethyl acrylate.

The test results are shown in Table 2.

Example 8

A high gloss printing sheet was produced and tested by the same procedures as in Example 6 except that the coating liquid (1) for the outermost surface coating layer was replaced by a coating liquid (4) having the following composition.

| Component | Part by weight |
|---|---|
| Electron beam-curable compound (8) | 70 |
| 2-butyl-2-ethylpropanediol diacrylate (Trademark: New Frontier C9A, made by Daiichi Kogyoseiyaku K.K.) | 30 |

The electron beam-curable compound (8) was prepared by first reacting a polyolefin diol having an average molecular weight of 2,000 with isophorone diisocyanate and secondly reacting the first reaction product with 2-hydroxyethyl acrylate.

The test results are shown in Table 2.

Example 9

A high gloss printing sheet was produced and tested by the same procedures as in Example 6 except that the coating liquid (1) for the outermost surface coating layer was replaced by a coating liquid (5) having the following composition.

Coating liquid (5)

| Component | Part by weight |
|---|---|
| Electron beam-curable compound (9) | 50 |
| 2-butyl-2-ethylpropanediol diacrylate (New Frontier C9A, made by Daiichi Kogyoseiyaku K.K.) | 25 |
| 1,9-nonanediol diacrylate (Trademark: New Frontier L-C9A, made by Daiichi Kogyoseiyaku K.K.) | 25 |

The electron beam-curable compound (8) was prepared by first reacting a polyolefin diol having an average molecular weight of 2,000 with isophorone diisocyanate and secondly reacting the first reaction product with 2-hydroxyethyl acrylate.

The test results are shown in Table 2.

Example 10

A high gloss printing sheet was produced and tested by the same procedures as in Example 6 except that the coating liquid (1) for the outermost surface coating layer was replaced by a coating liquid (6) having the following composition.

Coating liquid (6)

| Component | Part by weight |
|---|---|
| Electron beam-curable compound (10) (trademark: TEAI-1000, made by Nihon Soda K. K. | 50 |
| 2-butyl-2-ethylpropanediol diacrylate (New Frontier C9A) | 50 |

The electron beam-curable compound (10) was prepared by first reacting a hydrogenated 1,2-polybutadiene diol having an average molecular weight of 500 with a 2,4- and 2,6-tolylene diisocyanate mixture and secondly reacting the first reaction product with 2-hydroxyethyl acrylate.

The test results are shown in Table 2.

Example 11

A high gloss printing sheet was produced and tested by the same procedures as in Example 6 except that the coating liquid (1) for the outermost surface coating layer was replaced by a coating liquid (7) having the following composition.

Coating liquid (7)

| Component | Part by weight |
|---|---|
| Electron beam-curable compound (11) (Trademark: TEA-1000, made by Nihon Soda K. K.) | 50 |
| 2-butyl-2-ethylpropanediol diacrylate (New Frontier C9A | 50 |

The electron beam-curable compound (11) was prepared by first reacting a 1,2-polybutadiene diol having an average molecular weight of 500 with a 2,4- and 2,6-tolylene diisocyanate mixture and secondly reacting the first reaction product with 2-hydroxyethyl acrylate.

The test results are shown in Table 2.

Example 12

A high gloss printing sheet was produced and tested by the same procedures as in Example 6 except that the cast-coated paper sheet was replaced by a synthetic paper sheet (trademark: Yupo FPG-95, made by Oji Yuka Goseishi K.K.) having a basis weight of 74 $g/m^2$.

The test results are shown in Table 2.

Example 13

A high gloss printing sheet was produced and tested by the same procedures as in Example 6 except that the coating liquid (2) for the undercoating layer was replaced by a coating liquid (8) having the following composition.

Coating liquid (8)

| Component | Part by weight |
|---|---|
| Electron beam-curable polyester acrylate (Trademark: Aronix M-7100, made by Toa Gosei K. K.) | 70 |
| 1,9-nonanediol diacrylate (New Frontier L-C9A) | 30 |

The test results are shown in Table 2.

Example 14

A high gloss printing sheet was produced and tested by the same procedures as in Example 7 except that the coating liquid (2) for the outermost surface coating layer was replaced by the coating liquid (8) described in Example 13.

The test results are shown in Table 2.

Example 15

A high gloss printing sheet was produced and tested by the same procedures as in Example 8 except that the coating liquid (2) for the undercoating layer was replaced by a coating liquid (8) shown in Example 13.

The test results are shown in Table 2.

Example 16

A high gloss printing sheet was produced and tested by the same procedures as in Example 9 except that the coating liquid (2) for the undercoating layer was replaced by a coating liquid (8) shown in Example 13.

The test results are shown in Table 2.

Example 17

A high gloss printing sheet was produced and tested by the same procedures as in Example 10 except that the coating liquid (2) for the undercoating layer was replaced by a coating liquid (8) shown in Example 13.

The test results are shown in Table 2.

Example 18

A high gloss printing sheet was produced and tested by the same procedures as in Example 11 except that the coating liquid (2) for the undercoating layer was replaced by a coating liquid (8) shown in Example 13.

The test results are shown in Table 2.

Example 19

A high gloss printing sheet was produced and tested by the same procedures as in Example 17 except that the cast-coated paper sheet was replaced by a synthetic paper sheet (trademark: Yupo FPG-95, made by Oji Yuka Goseishi K.K.) having a basis weight of 74 $g/m^2$.

The test results are shown in Table 2.

Comparative Example 5

A high gloss printing sheet was produced and tested by the same procedures as in Example 6 except that the coating liquid (1) for the outermost surface coating layer was replaced by a coating liquid (9) having the following composition.

Coating liquid (9)

| Component | Part by weight |
|---|---|
| Rosin ester acrylate (Trademark: Beam Set 115, made by Arakawa Kagakukogyo K. K.) | 50 |
| 2-hydroxy-3-phenoxypropyl acrylate (Aronix M-5700) | 50 |

The test results are shown in Table 2.

Comparative Example 6

The coating liquid (2) of Example 6 was coated in a dry (cured) coating weight of 20 g/$m^2$. on a back surface of a front surface cast-coated paper sheet having a basis weight of 160 g/$m^2$ by using a Mayer bar. On the coated coating liquid (2) layer, a PET film having a thickness of 75 $\mu$m was superposed. Then, an electron beam irradiation was applied to the coating liquid (2) layer through the PET film under an acceleration voltage of 175 kV at an absorption dose of 3 Mrad in an atmosphere having an oxygen content of 500 ppm or less, to cure the coating liquid (2) layer. The resultant coated sheet was separated from the PET film.

The resultant coated sheet was subjected to the same tests as in Example 6.

The test results are shown in Table 2.

Comparative Example 7

A one side-cast coated paper sheet having a basis weight of 160 g/$m^2$ was subjected to the same printing and test procedures as in Example 6.

The test results are shown in Table 2.

TABLE 2

| Example No. | | White sheet glossness | Gloss after printing | Ink-setting property |
|---|---|---|---|---|
| Example | 6 | 91 | 83 | 0.19 |
| | 7 | 93 | 85 | 0.20 |
| | 8 | 88 | 81 | 0.12 |
| | 9 | 89 | 81 | 0.25 |
| | 10 | 87 | 79 | 0.22 |
| | 11 | 88 | 80 | 0.20 |
| | 12 | 90 | 81 | 0.22 |
| | 13 | 92 | 82 | 0.20 |
| | 14 | 92 | 84 | 0.21 |
| | 15 | 89 | 81 | 0.11 |
| | 16 | 88 | 81 | 0.25 |
| | 17 | 88 | 80 | 0.23 |
| | 18 | 90 | 82 | 0.22 |
| | 19 | 91 | 81 | 0.20 |
| Comparative | 5 | 95 | 90 | 1.00 |
| Example | 6 | 94 | 80 | 0.95 |
| | 7 | 60 | 72 | 0.05 |

Table 2 clearly indicates that the high gloss printing sheets of Examples 6 to 19 prepared in accordance with the present invention had satisfactory white sheet glossness, glossness after printing and ink-setting property, whereas the printing sheets of Comparative Examples 5 and 6 wherein the outermost surface coating layers were formed from the conventional electron beam-curable compounds, exhibited a very poor ink-setting property. The conventional cast-coated paper sheet of Comparative Example 7 had a very low white sheet glossness, and an unsatisfactory glossness after printing.

Example 20

A high gloss printing sheet was produced and tested by the following procedures.

(1) Preparation of Coating Liquids

An electron beam-curable coating liquid (A) for an outermost surface coating layer and an electron beam-curable coating liquid (B) for an undercoating layer were prepared in the following compositions.

Coatinq liquid (A)

| Component | Part by weight |
|---|---|
| Electron beam-curable organic compound (12) (Principal component: hydrogenated dimer acid epoxide acrylate oligomer, Trademark: DA-1, made by Arakawa Kagakukogyo K. K.) | 60 |
| 1,9-nonanediol diacrylate (New Frontier L-C9A) | 10 |
| Titanium dioxide pigment (Trademark: R-23, made by Sakai Kagaku K. K.) | 30 |

Coating liquid (B)

| Component | Part by weight |
|---|---|
| Electron beam-curable organic compound (12) (DA-1) | 70 |
| 1,9-nonanediol diacrylate (New Frontier L-C9A) | 30 |

(2) Production of High Gloss Printing Sheet

The coating liquid (A) was coated in a dry (cured) coating weight of 5 glm$^2$ on a surface of a casting base consisting of a polyester film having a thickness of 75 $\mu$m by using a wire bar, to form a coating liquid (A) layer.

The coating liquid (B) was coated in a dry (cured) coating weight of 10 g/$m^2$ on a surface of a substrate sheet consisting of a cast coated paper sheet having a basis weight of 128 g/$m^2$ (trademark: Mirrorkote Gold, made by New Oji Paper Co.) by using a wire bar, to form a coating liquid (B) layer. The coating liquid (A) layer coated on the casting base was superposed on the coating liquid (B) layer coated on the substrate sheet, and the resultant superposed layers was cured and adhered to each other by an electron beam irradiation under an acceleration voltage of 175 kV at an absorption dose of 3 Mrad in an atmosphere having an oxygen content of 500 ppm or less, to form an outermost surface coating layer and an undercoating layer adhered to each other and to the substrate sheet. The polyester film (casting base) was separated from the outermost surface coating layer of the resultant high gloss printing sheet.

(3) Tests and Evaluations (1) White sheet glossness

This was measured by the same test procedure as in Example 1.

(2) Suitability for printing (printing ink-setting property)

The high gloss printing sheet was printed by using a RI printing tester (trademark: RI-1, made by Ishikawajima Kikaisangyo K.K.) under the following conditions.

| | |
|---|---|
| Type of ink: | Black coloring ink (DIC FINE INK F-Glass-N-type, made by Dainihon Inki Kagakukogyo K. K.) |

Amount of ink: 0.5 g per entire area of printing roll
Printing speed: 30 rpm

The printing was carried out under the above-mentioned conditions while rotating a printing drum. On a printed surface of the resultant printed sheet, a synthetic paper sheet (trademark: Yupo FPG-95, made by Oji Yuka Goseishi K.K.) was superposed. The superposed sheets were placed on a clean rubber roll and then the printing drum was moved by about 2 cm every minute until 7 minutes after the placement of the superposed sheet, to allow the ink on the printed sheet to transfer to the synthetic paper sheet. Then, the color density of the transferred ink on the synthetic paper sheet was measured by Macbeth reflection color density tester RD-914 (trademark). When the measured color density became 0.10 or less, it was established that the ink-setting was completed. When the ink-setting time is 5 minutes or less, the printing sheet was evaluated satisfactory in the ink-setting property.

The test results are shown in Table 3.

Example 21

A high gloss printing sheet was produced and tested by the same procedures as in Example 20, except that the coating liquid (A) for the outermost surface coating layer was replaced by the coating liquid (C) having the following composition.

Coating liquid (C)

| Component | Part by weight |
|---|---|
| Electron beam-curable organic compound (14) (Principal component: dimer acid epoxide acrylate oligomer, Trademark: DA-5, made by Arakawa Kagakukogyo K. K.) | 35 |
| 2-butyl-2-ethylpropanediol diacrylate (Trademark: KU-C9A, Arakawa KagakuKogyo K. K.) | 20 |
| Lauryl acrylate (Trademark: KU-LA, made by Arakawa Kagakukogyo K. K.) | 15 |
| Titanium dioxide pigment (trademark: R-23, made by Sakai Kagaku K. K.) | 30 |

The test results are shown in Table 3.

Example 22

A high gloss printing sheet was produced and tested by the same procedures as in Example 20, except that the coating liquid (A) for the outermost surface coating layer was replaced by the coating liquid (D) having the following composition.

Coating liquid (D)

-continued

| Component | Part by weight |
|---|---|
| Electron beam-curable organic compound (15) (Principal component: dimer acid epoxide acrylate oligomer, Trademark: DA-8, made by Arakawa Kagakukogyo K. K.) | 35 |
| 2-butyl-2-ethylpropanediol diacrylate (KU-C9A) | 20 |
| Lauryl acrylate (KU-LA) | 15 |
| Titanium dioxide pigment (R-23) | 30 |

The test results are shown in Table 3.

Example 23

A high gloss printing sheet was produced and tested by the same procedures as in Example 20, except that the coating liquid (A) for the outermost surface coating layer was replaced by the coating liquid (E) having the following composition.

Coating liquid (E)

| Component | Part by weight |
|---|---|
| Electron beam-curable organic compound (16) (Principal component: dimer acid epoxide acrylate oligomer, Trademark: DA-10, made by Arakawa Kagakukogyo K. K.) | 35 |
| 2-butyl-2-ethylpropanediol diacrylate (KU-C9A) | 20 |
| Lauryl acrylate (KU-LA) | 15 |
| Titanium dioxide pigment (R-23) | 30 |

The test results are shown in Table 3.

Example 24

A high gloss printing sheet was produced and tested by the same procedures as in Example 20, except that the coating liquid (A) for the outermost surface coating layer was replaced by the coating liquid (F) having the following composition and no undercoating layer was formed.

Coating liquid (F)

| Component | Part by weight |
|---|---|
| Electron beam-curable organic compound (17) (Principal component: urethane-modified polypropylene glycol (molecular weight: 2,200) acrylate oligomer, Trademark: CJ-8, made by Nihon Kasei K. K.) | 65 |
| Acrylic acid dimer (Trademark: Aronix M-5600, made by Toa Gosei K. K.) | 5 |
| Titanium dioxide pigment (R-23) | 30 |

The coating liquid (F) was coated in a dry (cured) coating weight of 10 g/m$^2$ on a surface of a synthetic paper sheet (Yupo-95) by using a wire bar. A polyester film having a thickness of 75 $\mu$m was superposed on the coated coating liquid (F) layer, and an electron beam irradiation was applied to the coating liquid (F) layer through the polyester film under an acceleration voltage of 175 kV at an absorption dose of 3 Mrad in an atmosphere having an oxygen content of 500 ppm or less, to convert the coating liquid (F) layer to a cured outermost surface coating layer. The polyester film was separated from the outermost surface coating layer. A high gloss printing sheet was obtained.

The test results are shown in Table 3.

Comparative Example 8

A high gloss printing sheet was produced and tested by the same procedures as in Example 20, except that the coating liquid (A) for the outermost surface coating layer was replaced by the coating liquid (G) having the following composition.

Coating liquid (G)

| Component | Part by weight |
|---|---|
| Electron beam-curable organic compound (18) (Principal component: rosin ester acrylate, Trademark: Beam Set 115, made by Arakawa Kagakukogyo K. K.) | 50 |
| 2-hydroxy-3-phenoxypropyl acrylate (Aronix M-5700) | 20 |
| Titanium dioxide pigment (R-23) | 30 |

The test results are shown in Table 3.

Comparative Example 9

A high gloss printing sheet was produced and tested by the same procedures as in Example 20, except that the coating liquid (A) for the outermost surface coating layer was replaced by the coating liquid (H) having the following composition.

Coating liquid (H)

| Component | Part by weight |
|---|---|
| Electron beam-curable organic compound (19) (Principal component: polycapsolactone urethane acrylate, Trademark: Beam Set 505B, made by Arakawa Kagakukogyo K. K.) | 50 |
| 2-hydroxy-3-phenoxypropyl acrylate (Aronix M-5700) | 20 |
| Titanium dioxide pigment | 30 |

The test results are shown in Table 3.

Comparative Example 10

The same printing procedures and tests as in Example 20 was applied to a cast-coated surface of a cast-coated paper sheet (trademark: Mirrorcoat Gold, made from New Oji Paper Co.) having a basis weight of 128 $g/m^2$.

The test results are shown in Table 3.

Comparative Example 11

The same printing procedures and tests as in Example 20 was applied to a cast-coated surface of a cast-coated paper sheet (trademark: Crystalcoat, made from Nihon Kakoseishi K.K.) having a basis weight of 128 $g/m^2$.

The test results are shown in Table 3.

TABLE 3

| Example No. | | White sheet glossness | Ink-setting time (minute) |
|---|---|---|---|
| Example | 20 | 98 | 3 |
| | 21 | 97 | 3 |
| | 22 | 97 | 4 |
| | 23 | 98 | 4 |
| | 24 | 97 | 3 |
| Comparative | 8 | 95 | 7 or more |
| Example | 9 | 98 | 7 or more |
| | 10 | 65 | 1 |
| | 11 | 62 | 1 |

Table 3 clearly shows that the high gloss printing sheets of Examples 20 to 24 in accordance with the present invention had a very high gloss and a satisfactory ink-setting property.

The printing sheets of Comparative Examples 8 and 9, wherein conventional electron beam-curable organic compounds were used, exhibited an unsatisfactory ink-setting property.

The conventional cast-coated paper sheets indicated in Comparative Examples 10 and 11 had a poor glossness.

Example 25

A high gloss printing sheet was produced and tested by the following procedures.

(1) Preparation of Coating Liquids

An electron beam-curable coating liquid (a) for an outermost surface coating layer and an electron beam-curable coating liquid (b) for an undercoating layer were prepared in the following compositions.

Coating liquid (a)

| Component | Part by weight |
|---|---|
| Electron beam-curable organic compound (20) (Principal component: urethane-modified polypropyleneglycol (molecular weight: 2,200) acrylate oligomer, Trademark: CJ-8, made by Nihon Kasei K. K.) | 70 |
| Titanium dioxide pigment (Trademark: R-23, made by Sakai Kagaku K. K.) | 30 |

Coating liquid (b)

| Component | Part by weight |
|---|---|
| Electron beam-curable organic compound (21) (Principal component: urethane-modified polypropyleneglycol acrylate oligomer, Trademark: CJ-11, made by Nihon Kasei K. K.) | 100 |

(2) Production of High Gloss Printing Sheet

The coating liquid (a) was coated in a dry (cured) coating weight of 5 $g/m^2$ on a surface of a casting base consisting of a polyester film having a thickness of 75 $\mu m$ by using a Mayer bar, to form a coating liquid (A) layer.

The coating liquid (b) was coated in a dry (cured) coating weight of 10 $g/m^2$ on a surface of a substrate sheet consisting of a cast coated paper sheet having a basis weight of 128 g/m$^2$ (trademark: OK Royalcoat, made by New Oji Paper Co.) by using a Mayer bar, to form a coating liquid (b) layer. The coating liquid (a) layer coated on the casting base was superposed on the coating liquid (b) layer coated on the substrate sheet, and the resultant superposed layers were cured and adhered to each other by an electron beam irradiation under an acceleration voltage of 175 kV at an absorption dose of 3 Mrad in an atmosphere having an oxygen content of 500 ppm or less, to form an outermost surface coating layer and an undercoating layer adhered to each other and to the substrate sheet. The polyester film (casting base) was separated from the outermost surface coating layer of the resultant high gloss printing sheet.

(3) Tests and Evaluations

The white sheet grossness and suitability for printing (ink-setting property of the printing sheet) were measured by the same test procedures as in Example 20.

The test results are shown in Table 4.

Example 26

A high gloss printing sheet was produced and tested by the same procedures as in Example 25, except that the coating liquid (a) for the outermost surface coating layer was replaced by the coating liquid (c) having the following composition.

Coating liquid (c)

| Component | Part by weight |
|---|---|
| Electron beam-curable organic compound (21) ( CJ-11) | 70 |
| Titanium dioxide pigment (R-23) | 30 |

The test results are shown in Table 3.

Example 27

A high gloss printing sheet was produced and tested by the same procedures as in Example 25, except that the coating liquid (a) for the outermost surface coating layer was replaced by the coating liquid (d) having the following composition, and the undercoating layer was not formed.

Coating liquid (d)

| Component | Part by weight |
|---|---|
| Electron beam-curable organic compound (20) ( CJ-8) | 65 |
| Acrylic acid dimer (Aronix M-5600) | 5 |
| Titanium dioxide pigment (R-23) | 30 |

The coating liquid (d) was coated in a dry (cured) coating weight of 10 g/m$^2$ on a surface of a synthetic paper sheet (trademark: Yupo FPC-95, made by Oji Yuka Goseishi K.K.) having a thickness of 95 $\mu$m by using a wire bar to form a coating liquid (d) layer. A polyester film having a thickness of 75 $\mu$m was superposed on the coating liquid (d) layer, and an electron beam irradiation was applied to the coating liquid (d) layer through the polyester film at an acceleration voltage of 175 kV at an absorption dose of 3 Mrad in an atmosphere having an oxygen content of 500 ppm or less, to convert the coating liquid (d) layer to a cured outermost surface coating layer adhered directly to the synthetic paper sheet. The polyester film was removed from the outermost surface coating layer to provide a high gloss printing sheet.

The test results are shown in Table 4.

Comparative Example 12

A high gloss printing sheet was produced and tested by the same procedures as in Example 25, except that the coating liquid (a) for the outermost surface coating layer was replaced by the coating liquid (e) having the following composition.

Coating liquid (e)

| Component | Part by weight |
|---|---|
| Polypropyleneglycol (molecular weight: 600) acrylate (Trademark: Aronix M-260, made by Toa Gosei K. K.) | 60 |
| Titanium dioxide pigment (R-23) | 40 |

The test results are shown in Table 4.

Comparative Example 13

A high gloss printing sheet was produced and tested by the same procedures as in Example 25, except that the coating liquid (a) for the outermost surface coating layer was replaced by the coating liquid (f) having the following composition.

Coating liquid (f)

| | |
|---|---|
| Polypropyleneglycol (molecular weight: 700) acrylate (Trademark: Aronix M-270, made by Toa Gosei K. K.) | 60 |
| Titanium dioxide pigment (R-23) | 40 |

The test results are shown in Table 4.

TABLE 4

| Example No. | | White sheet glossness | Ink-setting time (minute) |
|---|---|---|---|
| Example | 25 | 93 | 3 |
| | 26 | 95 | 4 |
| | 27 | 97 | 3 |
| Comparative | 12 | 95 | 7 or more |
| Example | 13 | 96 | 7 |

Table 4 clearly shows that the high gloss printing sheets of Examples 25 to 27 in accordance with the present invention had a high glossness and a satisfactory ink-setting property, whereas the printing sheets of Comparative Examples 12 and 13 had a poor ink-setting property.

We claim:

1. A printing sheet comprising:

a substrate sheet, and an outermost surface coating layer formed on a surface of the substrate sheet and comprising an electron beam-cured resin produced from an electron beam-curable organic material, the electron beam-curable organic material comprising at least one unsaturated organic compound with at least one polyether structure of the formula (1):

(1)

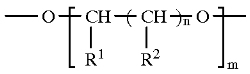

wherein $R_1$ represents a hydrogen atom, $R_2$ represents an alkyl group having 1 to 5 carbon atoms, n represents an integer of 1 to 9, m is an integer satisfying the equation:

$$(n+1)\times m=30 \text{ to } 300,$$

and, when n is 2 or more, a plurality of the alkyl groups represented by $R^2$ may be the same as or different from each other, the polyether structure of the formula (1) having a molecular weight of 1,000 to 10,000, and the unsaturated organic compound being selected from the group consisting of:

(1) those produced by first reacting a polyether compound having the polyether structure of the formula (1) with a polybasic carboxylic acid, and secondly reacting the first reaction product with at least one member selected from the group consisting of acrylic acid and methacrylic acid, and (2) those produced by first reacting a polyether compound having the polyether structure of the formula (1) with at least one member selected from aromatic, cycloaliphatic and aliphatic polyisocyanate compounds, and secondly reacting the first reaction product with at least one member selected from the group consisting of hydroxyacrylate compounds and hydroxymethacrylate compounds.

2. The printing sheet as claimed in claim 1, wherein at least one undercoating layer comprising an electron beam-cured resin is arranged between the substrate sheet and the outermost surface coating layer.

* * * * *